Nov. 15, 1966   H. S. ABER ETAL   3,285,624
SPLASH GUARD AND MOUNTING ASSEMBLY THEREFOR
Filed Oct. 19, 1964   2 Sheets-Sheet 1
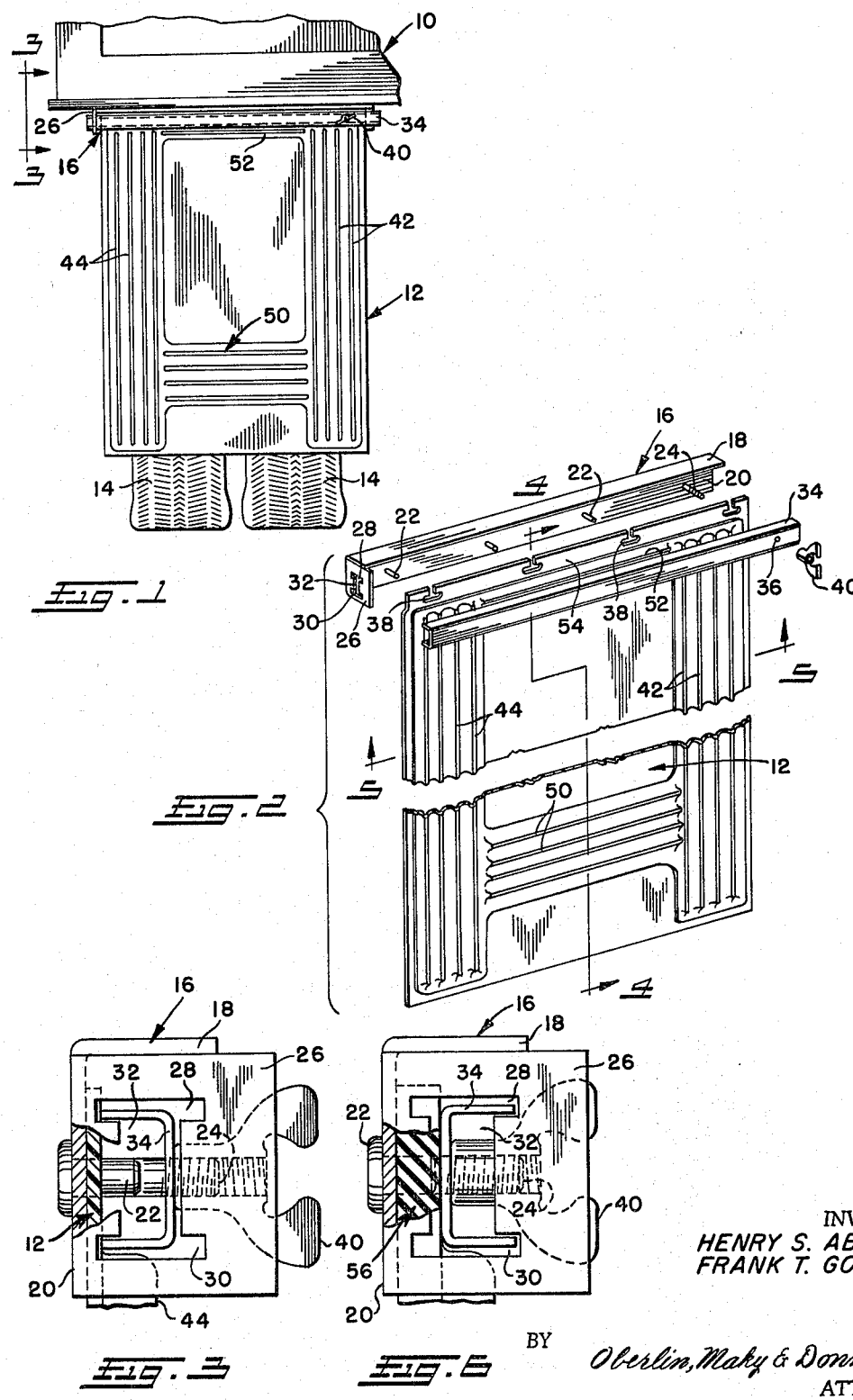
INVENTORS
HENRY S. ABER
FRANK T. GOETZ
BY Oberlin, Maky & Donnelly
ATTORNEYS

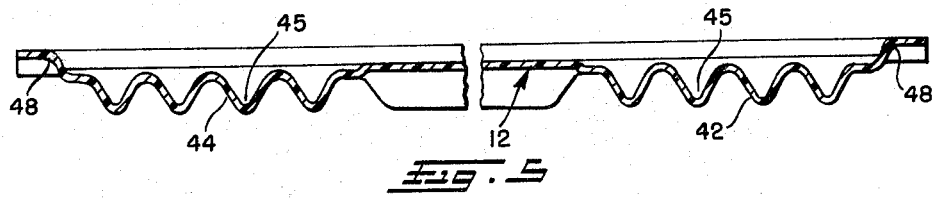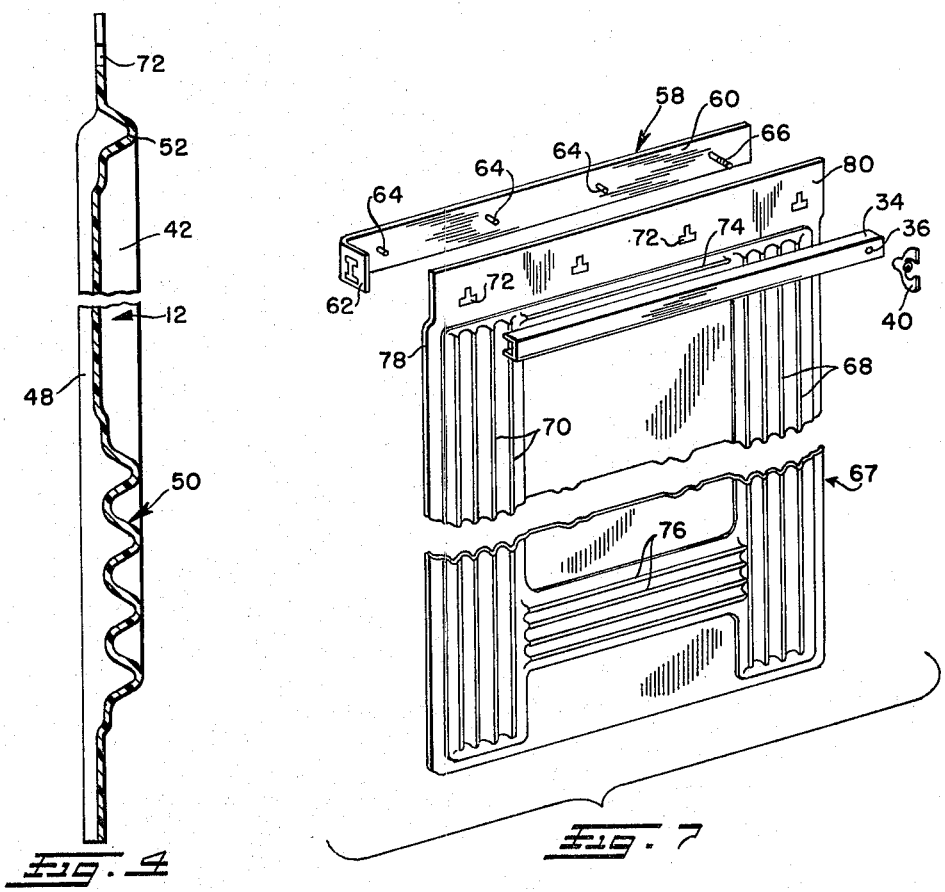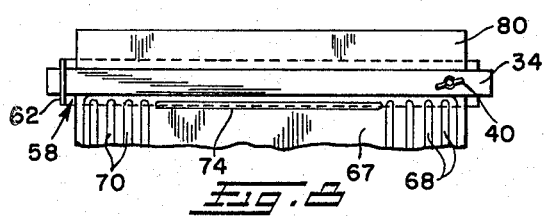

United States Patent Office 3,285,624
Patented Nov. 15, 1966

3,285,624
SPLASH GUARD AND MOUNTING ASSEMBLY
THEREFOR
Henry S. Aber, 4033 W. 140th St., Cleveland, Ohio
44135, and Frank T. Goetz, 31565 Lake Road,
Bay Village, Ohio 44140
Filed Oct. 19, 1964, Ser. No. 404,699
16 Claims. (Cl. 280—154.5)

The present invention relates to an improved splash guard and mounting assembly of the type for use on vehicles, e.g. trucks or trailers, to control the flow of water and the like rearwardly from the wheels of such vehicles.

Present splash guards and mounting assemblies are less than satisfactory for a number of reasons. The mountings are often difficult to originally install on the vehicle and the replacement of present splash guards as they become defective for one reason or another on such mountings is often inconvenient and relatively time consuming thereby causing the driver undesirable delay. Present guards are similarly characterized by numerous and significant deficiencies which include a disconcerting short useful life leading to frequent displacement, and an inability to inherently resist "sailing," thereby requiring supplemental stabilizing means to prevent such "sailing." "Sailing" is a term well understood by those in the art and refers to the tendency of the guards to swing rearwardly at relatively high vehicle speeds, such swinging obviously impairing the ability of the guard to perform its intended function. "Sailing" is sufficiently detrimental and of such potential danger to safe driving conditions that in certain states regulations exist which require that "sailing" be kept within minimum prescribed ranges. Such regulations necessitate the use of the noted supplementary stabilizing means. Present guards, which almost entirely are manufactured from rubber material, are further characterized by their inability to prevent splashing of water and the like from the respective sides of the guard whereby such water is thrown into the path of oncoming vehicles or vehicles attempting to pass the vehicle equipped with such guards.

With the above in mind, a primary object of the present invention is to provide a splash guard mounting assembly which can be readily mounted on the vehicle frame and permits quick installation or removal of the splash guard therefrom.

A further object of the present invention is to provide a mounting assembly capable of removably mounting guards having varying thicknesses.

Another important object of the present invention is to provide a splash guard constructed to inherently reduce "sailing" to an extent that additional stabilizing means are not required.

A further object of the present invention is to provide a splash guard configurated to substantially reduce sideward splashing of water and the like impinging against the guard and to direct such water and the like vertically downwardly over the guard to the surface over which the vehicle is traveling.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a rear end view of a vehicle having mounted thereon the preferred splash guard and mounting assembly of the present invention;

FIG. 2 is an exploded, perspective view of the preferred splash guard and mounting assembly of FIG. 1;

FIG. 3 is an enlarged, fragmentary side elevational view taken in the direction indicated by line 3—3 of FIG. 1;

FIG. 4 is a longitudinal sectional view of the splash guard, taken on line 4—4 of FIG. 2;

FIG. 5 is a transverse sectional view of the splash guard taken on line 5—5 of FIG. 2;

FIG. 6 is an enlarged, side elevational view similar to FIG. 3 showing how the mounting assembly is arranged for accommodating a splash guard of relatively greater thickness;

FIG. 7 is an exploded, perspective view of a modified form of mounting assembly and splash guard, and FIG. 8 is a rear end view of the modified splash guard and mouting assembly of FIG. 7, with the guard being shown mounted on the mounting assembly.

Referring now in more detail to the application drawings, wherein like reference numerals are used to indicate like parts, and initially to FIG. 1, a vehicle of the general type with which the splash guard and mounting assembly of the present invention is adapted to be employed is generally indicated at 10. A splash guard generally indicated at 12 is mounted on the vehicle 10 rearwardly of the dual wheels 14. The vehicle 10 forms no part of the present invention and in the form shown exemplifies a truck or trailer body, although it will be understood that the present invention can be advantageously employed with other type vehicles desirably provided with splash guard equipment.

As best shown in FIG. 2, a mounting bracket generally indicated at 16 is adapted to be mounted in any suitable location on the vehicle 10, normally on the underframe thereof, with the bracket 16 in the FIGS. 1–6 form of the invention being generally L-shaped and provided with a top horizontal flange 18 for effecting such mounting. The flange 18 may be secured to the vehicle underframe in any suitable manner (not shown), for example by welding or by mounting bolts.

The bracket 16 further includes a vertical, depending flange or leg 20 having mounted thereon a plurality of spaced, smooth studs commonly designated at 22 and a threaded stud 24 relatively adjacent one end thereof. The studs 22 and 24 are preferably of the same or similar diameter, with the threaded stud 24 extending outwardly from the flange or leg 20 a substantially greater distance than the studs 22 for a purpose which will become presently apparent.

The mounting bracket 16 further includes a forwardly extending end portion 26 which is rigidly secured to both of the flanges 18 and 20 and which, in the form shown, extends slightly rearwardly beyond the top flange 18. The end portion 26 of the bracket is formed with a generally I-shaped opening having spaced, generally horizontally extending portions 28 and 30 and an interconnecting portion 32 normal to such openings.

The mounting assembly further includes a channel-shaped clamping member 34 the base portion of which is provided with an opening 36 relatively adjacent one end thereof. Such opening is adapted to be aligned with an disposed over the threaded stud 24 when mounting the splash guard 12. The clamp member 34 is somewhat longer than the mounting bracket 18, with one end thereof extending through the generally I-shaped opening formed in the bracket end section 26. By means of such generally I-shaped opening, the clamping member 34 can be mounted either in the manner shown in FIG. 2 or by reversing the same 180°, as shown in FIG. 6. The orientation of the clamping bar in FIGS. 1–3 permits mounting of relatively thin guards, for example, approximately ⅛ inch in thickness, whereas the orientation of the clamp member 34 in the FIG. 6 form permits mounting of splash guards up to and slightly beyond ⅜ inch in thickness.

The splash guard 12 is formed preferably at the top thereof with as eries of inverted, generally T-shaped openings commonly designated at 38, with the vertical or stem portion of such openings being spaced and of a suitable diameter to permit alignment with the studs 22 and 24. The guard 12 can thus be quickly mounted or suspended on the bracket 16 by aligning the bottoms of the vertical portions of the openings 38 with the studs 22 and 24, and then shifting the same in either direction for movement of the studs into the horizontal leg portions of the openings 38. It will be apparent that generaly L-shaped openings could also be provided to effect such mounting. After such suspension of the guard 12 on the mounting bracket 16, the clamp member 34 is tightened over the guard 12 by means of a wing nut 40 which threadedly engages the stud 24 for securing the assembly in position. It should be noted that the guard 12 can be installed or removed from the mounting assembly merely by loosening the wing nut 40 while the clamp member 34 is in operative position thereby to permit relative movement between the guard and the clamp member.

The guard 12 is provided with a plurality of vertical ribs, with one group of such ribs being commonly indicated at 42 and formed adjacent one side of the guard and a second group of such ribs being commonly indicated at 44 and formed in the guard adjacent the opposite side thereof. The ribs are directed rearwardly from the plane of the guard thus to form vertical recesses or grooves commonly designated at 45 in the side of the guard facing the vehicle tires. Thus, any water or like matter sprayed from the vehicle tires and striking the guard in the region of such grooves will be carried vertically downwardly for emanation from the guard at the bottom thereof.

At each side of the guard 12 a rib 48 is formed which extends from the plane of the guard in a direction opposite to the rib groups 42 and 44, i.e., in a direction toward the vehicle wheels 14. The ribs 48 function to intercept water and the like moving to either side of the guard following impingement thereagainst. Any such water or the like striking the side ribs 48 will be directed primarily downwardly and will leave the guard adjacent the bottom thereof, thereby greatly reducing side splash from the guard, which at present forms a very objectionable characteristic of available splash guard constructions. It should be noted that the ribs 42 and 44 also function to reduce sideward movement of water and the like impinging against the flat central portion of the guard. Water contacting the rib walls defining the grooves 45 will frequently rebound from such surface into the path of laterally moving water particles, with the resulting contact causing such particles to drop downwardly.

The rib groups 42 and 44 and the side ribs 48 serve not only to direct water and the like downwardly from the guard as described but in addition serve a primary function to substantially rigidify the guard, to the extent that additional or supplemental "anti-sailing" devices need not be employed with the splash guard 12.

The guard 12 further includes a series of horizontal ribs commonly designated at 50 relatively adjacent the bottom of the guard, and a top, horizontally directed rib 52 relatively adjacent the top of the guard at a level coinciding with the uppermost portions of the rib groups 42 and 44 and the side ribs 48. The ribs 50 and 52 serve to further rigidify the splash guard 12 and thus further improve the "anti-sailing" characteristics of the guard.

As clearly seen in FIG. 2, the top portions of the ribs 42 and 44 and the side ribs 48 terminate below the top of the guard, with a flat space 54 being provided at the top of a vertical dimension generally coinciding with the width of the clamp member 34 thereby to provide a smooth flat surface against which the clamp may engage. The upper terminus of the rib groups 42, 44 and the rib 52 preferably tightly abut the bottom of the clamp member 34 when the unit is assembled to further reduce any tendency of the guard to "sail." The splash guard illustrated in FIGS. 1–5 of the invention is preferably formed from a high-density polyethylene and is approximately ⅛ inch in thickness.

There is shown in FIG. 6 an end view of the mounting assembly wherein the clamp member 34 is arranged for accommodating a splash guard generally indicated at 56 which is substantially thicker than the guard 12 previously described. The guard 56 represents a commercially available rubber guard having a thickness of approximately ⅜ inch. To mount the thicker guard 56 on the mounting assembly, as best shown in FIG. 6, the clamp member is reversed where by the parallel leg portions of the clamp member 34 extend rearwardly in the portions 28 and 30 of the I-shaped opening in the end section 26 of the bracket, with the base of the clamp member 34, in this instance, contacting the guard. The guard 56 is provided with openings (not shown) for receiving the studs 22 and 24 of the mounting bracket, whereby tightening of the wing nut 40 firmly mounts the guard on the mounting assembly.

There is shown in FIGS. 7 and 8 a slightly modified forms of mounting bracket and splash guard. The bracket, generally indicated at 58, instead of being generally L-shaped in cross section, comprises a single leg 60 having rigidly secured at one end thereof a flange section 62 constructed similar to the above-described end section 26. The leg 60 is provided with smooth stubs 64 and a threaded stud 66 for receiving the splash guard generally indicated at 67. Clamp member 34, of identical construction as that above described, is similarly provided with an opening 36 for receiving the threaded stud 66, with a wing nut 40 engaging the stud 66 to clamp the splash guard in position. The leg 60 can be mounted on a vertical supporting surface in any suitable manner forming no part of the present invention.

The splash guard illustrated in FIGS. 7 and 8 is essentially the same as in the form previously described in FIGS. 1–5, and is similarly preferably made from polyethylene. In the FIGS. 7 and 8 form, however, the upper ends of the rib groups commonly designated here at 68 and 70, respectively, terminate substantially lower than in the form previously described, with inverted, generally T-shaped openings 72 being similarly formed in the guard in a lower region. A top, horizontal rib 74 is provided generally coextensive with the upper ends of the ribs 68 and 70, horizontal ribs commonly indicated at 76 are formed relatively adjacent the bottom of the guard, and side ribs 78 similar to the above-described ribs 48 are formed at opposite sides of the guard. When the guard 67 is mounted on the bracket 78, the top flat portion 80, which is of relatively expanded width, extends partially above the top of the leg 60 of the mounting bracket, as shown in FIG. 8, to intercept water and the like directed toward the area immediately above the support bracket. Such arrangement is particularly desirable when the splash guard and mounting are desired to be used with sliding tandems and tractor trailers.

It will thus be seen that the present invention provides distinct advantages over present splash guard constructions and mounting equipment therefor. The mounting assembly is uniquely constructed to accommodate splash guards of varying thickness, and permits quick installation or removal of the splash guard therefrom through the manipulation of but a single wing nut. The splash guards in certain of the disclosed forms are formed from polyethylene and are provided with a plurality of ribs which function not only to direct water and the like downwardly from the guard but also to provide a rigidified guard which is highly stable at relatively high speeds, thereby eliminating the need of supplemental "anti-sailing" devices which commonly must be provided with presently available splash guards.

It will be understood that minor changes or deviations from the subject matter above described will suggest themselves to those skilled in the art without, however, departing from the principles of the invention. For example, although the several described splash guards forms are shown mounted on specially constructed brackets, the novel ribbed splash guards with the noted inherent advantages will find equally satisfactory use when mounted on presently available bracket constructions.

Other modes of applying the principle of the invention may be employed, change being made as regards the details described, provided the features stated in any of the following claims or the equivalent of such be employed.

We therefore particularly point out and distinctly claim as our invention:

1. A splash guard mounting assembly adapted to be mounted on a wheeled vehicle comprising, a mounting bracket generally L-shaped in cross section, with one leg of such L-shaped bracket being adapted to be mounted on the underframe of the vehicle, the other leg of said L-shaped bracket being provided with a plurality of studs extending from the surface thereof, with at least one of said studs being threaded, said bracket further including an end section rigidly secured to at least one of said legs and extending in the same direction as the said one leg, said end section being formed with a generally I-shaped opening, a channel-shaped clamp member adapted to overlie said other leg of said bracket and being provided with at least one opening in the base thereof adapted to be aligned with said threaded stud, one end of said clamp member extending through said generally I-shaped opening in said end section of said bracket when said clamp member is mounted in position with said opening thereof receiving said threaded stud, said I-shaped opening being shaped to receive said channel-shaped clamp member in reversed positions thereby to vary the distance between said other leg and the effective clamping surface of said clamp member, and means engaging said threaded stud for holding said clamp member in position on said bracket.

2. A splash guard mounting assembly adapted to be mounted on a wheeled vehicle comprising, a mounting bracket having a flat plate section and an end section at one end thereof extending generally normal thereto, said plate section being provided with a plurality of studs extending from the surface thereof, with at least one of said studs being threaded, said end section being formed with a generally I-shaped opening, a channel-shaped clamp member adapted to overlie said plate section of said bracket and being provided with at least one opening in the base thereof adapted to be aligned with said threaded stud, one end of said clamp member extending through said generally I-shaped opening in said end section of said bracket when said clamp member is mounted in position with said opening thereof receiving said threaded stud, said I-shaped opening being shaped to receive said channel-shaped clamp member in reversed positions thereof thereby to vary the difference between said other leg and the effective clamping surface of said clamp member, and means engaging said threaded stud for holding said clamp member in position on said bracket, whereby said mounting assembly is adapted to accommodate splash guards having portions thereof extending substantially above said bracket.

3. A splash guard mounting assembly adapted to be mounted on a wheeled vehicle comprising, a mounting bracket generally L-shaped in cross section, with one leg of such L-shaped bracket being adapted to be mounted on the underframe of the vehicle, the other leg of said L-shaped bracket being provided with a plurality of studs extending from the surface thereof, with at least one of said studs being threaded, said bracket further including an end section rigidly secured to at least one end of said legs and extending in the same direction as the said one leg, said end section being formed with a generally I-shaped opening, a channel-shaped clamp member adapted to overlie said other leg of said bracket and being provided with at least one opening in the base thereof adapted to be aligned with said threaded stud, one end of said clamp member extending through said generally I-shaped opening in said end section of said bracket when said clamp member is mounted in position with said opening thereof receiving said threaded stud, a splash guard having a plurality of openings relatively adjacent the top thereof corresponding with the dimensions and spacing of said studs to permit said guard to be suspended over said studs between said other leg of said bracket and said clamp member, and means engaging said threaded stud for holding said clamp member and thus said guard in position on said bracket.

4. The combination of claim 3 wherein said splash guard is formed with a plurality of vertically extending ribs relatively adjacent the opposed sides thereof, the upper ends of such ribs terminating closely adjacent the bottom of said clamp member when said guard is mounted on said mounting assembly.

5. The combination of claim 4 wherein said splash guard further includes a generally horizontal rib generally coextensive with the upper ends of said vertical ribs and serving with said vertical ribs to rigidify said splash guard and reduce swinging movement thereof.

6. The combination of claim 5 wherein the region of said splash guard above the upper ends of said vertical ribs and said generally horizontal rib is flat, and wherein said openings in said guard are formed in such flat region.

7. A splash guard mounting assembly adapted to be mounted on a wheeled vehicle comprising, a mounting bracket having a flat plate section and an end section at one end thereof extending normal thereto, said plate section being provided with a plurality of studs extending from the surface thereof, with at least one of said studs being threaded, said end section being formed with a generally I-shaped opening, a channel-shaped clamp member adapted to overlie said plate section of said bracket and being provided with at least one opening in the base thereof adapted to be aligned with said threaded stud, one end of said clamp member extending through said generally I-shaped opening in said end section of said bracket when said clamp member is mounted in position with said opening therein receiving said threaded stud, a splash guard having a plurality of openings relatively adjacent the top thereof corresponding with the dimensions and spacing of said studs to permit said guard to be suspended over said studs between said other leg of said bracket and said clamp member, and means engaging said threaded stud for holding said clamp member and thus said guard in position on said bracket.

8. The combination of claim 7 wherein said splash guard is formed with a plurality of vertically extending ribs relatively adjacent the opposed sides thereof, the upper ends of such ribs terminating closely adjacent the bottom of said clamp member when said guard is mounted on said mounting assembly.

9. The combination of claim 8 wherein said splash guard further includes a generally horizontal rib coextensive with the upper ends of said vertical ribs and serving with said vertical ribs to rigidify said splash guard and reduce swinging movement thereof.

10. The combination of claim 7 wherein the upper region of said splash guard is flat, with said openings in said guard being formed in such flat region, a portion of such flat region of said guard extending above said bracket when said splash guard is mounted.

11. A splash guard mounting assembly adapted to be mounted on a wheeled vehicle comprising, a mounting bracket adapted to be mounted on the underframe of the vehicle, said bracket being provided with at least one leg having a plurality of studs extending from the surface thereof, with at least one of said studs being threaded, said bracket further including an end section rigidly secured to said leg and extending normal thereto, said end section being formed with a generally I-shaped opening, a channel-shaped clamp member adapted to overlie said leg and being provided with at least one opening in the base.

12. A splash guard adapted to be mounted on a wheeled vehicle to prevent splashing rearwardly thereof, comprising a plurality of vertically extending ribs which terminate relatively adjacent the top and bottom of said guard, said guard being formed adjacent the top thereof with a relatively smooth, flat portion extending across the entire width thereof for mounting the same, said ribs serving to rigidify said guard and being directed rearwardly relative to the vehicle from the plane of the guard thus to form vertical grooves adapted to receive water and the like from the vehicle wheels and direct the same downwardly from the guard, said guard being further formed with a horizontal rib generally coextensive with the upper ends of said vertical ribs and a series of horizontal ribs extending between said vertically extending ribs relatively adjacent the bottom thereof, and at least one opening in the relatively smooth top portion of said guard for mounting the same.

13. A splash guard mounting assembly to be mounted on a wheeled vehicle comprising, a mounting bracket generally L-shaped in cross section, with one leg of such L-shaped bracket being adapted to be mounted on the underframe of the vehicle, the other leg of said L-shaped bracket being provided with at least one threaded stud extending from the surface thereof, said bracket further including an end section rigidly secured to at least one of said legs and extending in the same direction as the said one leg, said end section being formed with a generally I-shaped opening, a channel-shaped clamp member adapted to overlie said other leg of said bracket and being provided with at least one opening in the base thereof adapted to be aligned with said threaded stud, one end of said clamp member extending through said generally I-shaped opening in said end section of said bracket when said clamp member is mounted in position with said opening thereof receiving said threaded stud, said I-shaped opening being shaped to receive said channel-shaped clamp member in reversed positions thereof thereby to vary the distance between said other leg and the effective clamping surface of said clamp member, and means engaging said threaded stud for holding said clamp member in position on said bracket.

14. A splash guard mounting assembly adapted to be mounted on a wheeled vehicle comprising, a mounting bracket generally L-shaped in cross section, with one leg of such L-shaped bracket being adapted to be mounted on the underframe of the vehicle, the other leg of said L-shaped bracket being provided with at least one threaded stud extending from the surface thereof, said bracket further including an end section rigidly secured to at least one end of said legs and extending in the same direction as the said one leg, said end section being formed with a generally I-shaped opening, a channel-shaped clamp member adapted to overlie said other leg of said bracket and being provided with at least one opening in the base thereof adapted to be aligned with said threaded stud, one end of said clamp member extending through said generally I-shaped opening in said end section of said bracket when said clamp member is mounted in position with said opening thereof receiving said threaded stud, a splash guard having at least one opening relatively adjacent the top thereof for receiving said threaded stud when said guard is disposed contiguous said other leg of said bracket, and means engaging said threaded stud for holding said clamp member and thus said guard in position on said bracket.

15. A splash guard mounting assembly adapted to be mounted on a wheeled vehicle comprising, a mounting bracket having a flat plate section and an end section at one end thereof extending generally normal thereto, said plate section being provided with at least one threaded stud extending from the surface thereof, said end section being formed with a generally I-shaped opening, a channel-shaped clamp member adapted to overlie said plate section of said bracket and being provided with at least one opening in the base thereof adapted to be aligned with said threaded stud, one end of said clamp member extending through said generally I-shaped opening in said end section of said bracket when said clamp member is mounted in position with said opening thereof receiving said threaded stud, said I-shaped opening being shaped to receive said channel-shaped clamp member in reversed positions thereof thereby to vary the difference between said other leg and the effective clamping surface of said clamp member, and means engaging said threaded stud for holding said clamp member in position on said bracket, whereby said mounting assembly is adapted to accommodate splash guards having portions thereof extending substantially above said bracket.

16. A splash guard mounting assembly adapted to be mounted on a wheeled vehicle comprising, a mounting bracket having a flat plate section and an end section at one end thereof extending normal thereto, said plate section being provided with at least one threaded stud extending from the surface thereof, said end section being formed with a generally I-shaped opening, a channel-shaped clamp member adapted to overlie said plate section of said bracket and being provided with at least one opening in the base thereof adapted to be aligned with said threaded stud, one end of said clamp member extending through said generally I-shaped opening in said end section of said bracket when said clamp member is mounted in position with said opening therein receiving said threaded stud, a splash guard having at least one opening relatively adjacent the top thereof for receiving said threaded stud when said guard is disposed contiguous said flat plate section, and means engaging said threaded stud for holding said clamp member and thus said guard in position on said bracket.

References Cited by the Examiner

UNITED STATES PATENTS

| | | | |
|---|---|---|---|
| 938,057 | 10/1909 | Jay | 129—23 |
| 2,699,955 | 1/1955 | Eaves | 280—154.5 |
| 2,714,015 | 6/1955 | Sherman | 280—154.5 |
| 3,027,178 | 3/1962 | Eaves | 280—154.5 |
| 3,158,386 | 11/1964 | Tillinghast | 280—154.5 |
| 3,198,545 | 8/1965 | McDaniel | 280—154.5 |

BENJAMIN HERSH, *Primary Examiner.*

W. A. MARCONTELL, M. S. SALES,
*Assistant Examiners.*